United States Patent
Young

(10) Patent No.: US 9,495,707 B2
(45) Date of Patent: Nov. 15, 2016

(54) SYSTEMS AND METHODS TO FACILITATE GENERATION OF PRICING INFORMATION VIA A PRICING GRAPH

(75) Inventor: Nicholas A. Young, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 1964 days.

(21) Appl. No.: 10/459,148

(22) Filed: Jun. 11, 2003

(65) Prior Publication Data

US 2004/0044608 A1    Mar. 4, 2004

Related U.S. Application Data

(60) Provisional application No. 60/388,003, filed on Jun. 12, 2002.

(51) Int. Cl.
    *G06Q 30/02*      (2012.01)
    *G06Q 40/04*      (2012.01)
    *G06Q 40/00*      (2012.01)
    *G06Q 40/06*      (2012.01)

(52) U.S. Cl.
CPC .............. *G06Q 40/04* (2013.01); *G06Q 30/02* (2013.01); *G06Q 40/00* (2013.01); *G06Q 40/06* (2013.01)

(58) Field of Classification Search
CPC .............. G06Q 30/0283; G06Q 10/00; G06Q 10/0637; G06Q 10/02; G06Q 10/0283; G06Q 30/02; G06F 3/0481
USPC .......... 705/400, 35–38, 1, 5–7, 10, 7.36, 30, 705/7.35; 703/2; 345/440; 715/771
See application file for complete search history.

(56) References Cited

U.S. PATENT DOCUMENTS

| | | | | |
|---|---|---|---|---|
| 5,257,363 A | * | 10/1993 | Shapiro et al. | 703/13 |
| 5,727,161 A | * | 3/1998 | Purcell, Jr. | G06F 17/246 705/30 |
| 5,852,812 A | * | 12/1998 | Reeder | 705/39 |
| 6,161,098 A | * | 12/2000 | Wallman | G06Q 40/02 705/36 T |
| 6,275,808 B1 | * | 8/2001 | DeMarcken | G06Q 10/02 705/400 |
| 6,381,578 B1 | * | 4/2002 | DeMarcken | 705/6 |
| 6,456,986 B1 | * | 9/2002 | Boardman | G06F 17/30607 379/111 |
| 6,516,303 B1 | * | 2/2003 | Wallman | 705/36 T |
| 6,907,404 B1 | * | 6/2005 | Li | G06Q 20/10 705/35 |

(Continued)

OTHER PUBLICATIONS

Wildermuth, Scott, "Web investment pays off", Dec. 1997/Jan. 1998; Datamation. Barrington, vol. 44, Iss. 1; p. 115, 3 pgs.*

(Continued)

*Primary Examiner* — Shannon Campbell
*Assistant Examiner* — Freda A Nelson

(57) ABSTRACT

Systems and methods are provided to generate and exchange pricing information by a pricing engine. According to one embodiment, a pricing graph having a plurality of inter-dependent nodes is constructed. The pricing graph includes at least one input pricing information node and output pricing information node. In addition, at least one node provides information that effects information received by that node. A frame is established with at least one input pricing information slot and output pricing information slot. The pricing graph is then executed via a pricing engine in substantially real time. As a result, a value in the input pricing information slot is provided to the input pricing information node and a value for the output pricing information slot is received from the output pricing information node.

25 Claims, 11 Drawing Sheets

(56) References Cited

U.S. PATENT DOCUMENTS

| | | | | |
|---|---|---|---|---|
| 8,225,223 | B2* | 7/2012 | Becerra, Jr. | 715/771 |
| 2001/0051951 | A1* | 12/2001 | Nishikawa | 707/104.1 |
| 2002/0059126 | A1* | 5/2002 | Ricciardi | 705/36 |
| 2002/0188546 | A1* | 12/2002 | Tang | G06Q 40/04 705/37 |
| 2004/0268104 | A1* | 12/2004 | Cooper | G06F 15/7821 712/245 |

OTHER PUBLICATIONS

Koulisianis et al., "A Web-Based Problem Solving Environment for Solution of Option Pricing Problems and Comparison of Methods", Apr. 21-24, 2002, ICCS 2002, LNCS 2329, pp. 673-682.*
Ben-Natan, Ron, XML Computation Trees, Aug. 2002, XML-JOURNAL.com, pp. 16-19.*
Wildermuth, Scott, "Web investment pays off", Dec. 1997/Jan. 1998; Datamation. Barrington, vol. 44, Iss. 1 p. 115, 3 pgs.*

* cited by examiner

200

FRAME

| BOND 101 | |
|---|---|
| YIELD | 0.05 |
| PRESENT VALUE | 100 |
| PRICE | 101 |
| DURATION | 10 YEARS |
| BOND 102 | |
| YIELD | .07 |
| PRESENT VALUE | 95 |
| PRICE | 96 |
| DURATION | 10 YEARS | o
o
o

FIG. 2

| GRAPH IDENTIFIER 702 | NODE IDENTIFIER 704 | DESCRIPTION 706 | INPUTS 708 | OUTPUTS 710 | UPDATE 712 |
|---|---|---|---|---|---|
| G101 | N101-1 | YIELD | MARKET DATA | N101-2 | NEW |
| G101 | N101-2 | PRESENT VALUE | N101-1; N101-3 | N101-3; N101-4 | NEEDED |
| G101 | N101-3 | PRICE | N101-2 | N101-2 | NEEDED |
| G101 | N101-4 | DURATION | N10-1-2 | NONE | NEEDED |
| G102 | N102-1 | PRICE | N102-3; N102-7 | N102-8 | NO |

| INVESTMENT IDENTIFIER 802 | SLOT DESCRIPTION 804 | GRAPH IDENTIFIER 806 | NODE IDENTIFIER 808 | VALUE 810 |
|---|---|---|---|---|
| BOND 101 | YIELD | G101 | N101-1 | 0.05 |
| BOND 101 | PRESENT VALUE | G101 | N101-2 | 100 |
| BOND 101 | PRICE | G101 | N101-3 | 101 |
| BOND 101 | DURATION | G101 | N101-4 | 10 YEARS |
| BOND 102 | YIELD | G101 | N101-1 | 0.07 |
| BOND 102 | PRESENT VALUE | G101 | N101-2 | 94 |
| BOND 102 | PRICE | G101 | N101-3 | 103 |
| BOND 102 | DURATION | G101 | N101-4 | 7.5 YEARS |
| BOND 103 | YIELD | G101 | N101-1 | 0.04 |

FIG. 8

SYSTEMS AND METHODS TO FACILITATE GENERATION OF PRICING INFORMATION VIA A PRICING GRAPH

CROSS-REFERENCE TO RELATED APPLICATION

The present application claims the benefit of U.S. Provisional Application No. 60/388,003 entitled "Systems and Methods to Facilitate Generation of Pricing Information via a Pricing Graph" and filed Jun. 12, 2002.

COPYRIGHT AUTHORIZATION

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates to pricing information. In particular, the present invention relates to systems and methods to facilitate generation of pricing information via a pricing graph.

BACKGROUND

A user may need to access pricing information associated with, for example, an investment instrument (e.g., a currency denominated amount or a spread value). For example, a trader may need to access pricing information when making trading decisions (e.g., whether or not a particular investment instrument should be bought or sold). Similarly, pricing information may be needed to manage risk (e.g., a risk associated with a portfolio of investment instruments).

The pricing information associated with an investment instrument may be based on a number of underlying and inter-related values. For example, pricing information associated with a bond may depend on a current rate and broker quotes. Once the pricing information is calculated based on these underlying values, the information can be provided to a user.

A number of problems, however, may be encountered when pricing information is generated. For example, pricing information can be very dynamic (e.g., broker quotes might continuously change during the day) and therefore a significant number of calculations may need to be performed. Moreover, pricing information is typically time-sensitive (e.g., a trader may need to know a current bond price in order to make a trading decision), so the calculations need to be performed in substantially real-time. In addition, a user may need to access pricing information associated with a large number of investment instruments (e.g., hundreds of bonds). These factors can make the generation and use of pricing information an expensive and complex task (e.g., requiring a large amount of computer resources).

SUMMARY

To alleviate problems inherent in the prior art, the present invention introduces systems and methods to facilitate generation of pricing information via a pricing graph.

One embodiment of the present invention comprises a pricing graph having a plurality of inter-dependent nodes, including: (i) at least one input pricing information node and (ii) at least one output pricing information node, wherein at least one node provides information that effects information received by that node. A frame with at least one input pricing information slot and at least one output pricing information slot is also provided along with a pricing engine adapted to execute the pricing graph in substantially real time, wherein (i) a value in the input pricing information slot is provided to the input pricing information node and (ii) a value for the output pricing information slot is received from the output pricing information node.

According to one embodiment, a pricing graph having a plurality of inter-dependent nodes is constructed. The pricing graph includes at least one input pricing information node and at least one output pricing information node. In addition, at least one node provides information that effects information received by that node. A frame is established with at least one input pricing information slot and at least one output pricing information slot. The pricing graph is then executed via a pricing engine in substantially real time. As a result, a value in the input pricing information slot is provided to the input pricing information node and a value for the output pricing information slot is received from the output pricing information node.

In another embodiment, a pricing graph is constructed with a plurality of inter-dependent nodes, including at least one market data node and investment price node. A frame is also established with at least one market data slot and investment price slot. The pricing graph is then evaluated via a pricing engine in substantially real time. As a result, a value in the market data slot is provided to the market data node and a value for the investment price slot is received from the investment price node.

In still another embodiment, a pricing graph is constructed with a plurality of inter-dependent nodes, including at least one input pricing information node and output pricing information node. The pricing graph is then automatically evaluated to identify potential modes, wherein a mode is associated with a path through the pricing graph.

In yet another embodiment, a pricing graph is constructed with a plurality of inter-dependent nodes, including at least one input pricing information node and output pricing information node. A frame is established with at least one input pricing information slot and output pricing information slot. A set of input information is received, and the pricing graph is executed via a pricing engine based on the set of input information. An indication of the set of input information is then stored along with an indication of a set of nodes associated with said execution.

Another embodiment comprises: means for constructing a pricing graph having a plurality of inter-dependent nodes, including: (i) at least one input pricing information node and (ii) at least one output pricing information node, wherein at least one node provides information that effects information received by that node; means for establishing a frame with at least one input pricing information slot and at least one output pricing information slot; and means for executing the pricing graph via a pricing engine in substantially real time, wherein (i) a value in the input pricing information slot is provided to the input pricing information node and (ii) a value for the output pricing information slot is received from the output pricing information node.

Another embodiment comprises: means for constructing a pricing graph having a plurality of inter-dependent nodes, including: (i) at least one market data node and (ii) at least one investment price node; means for establishing a frame with at least one market data slot and at least one investment price slot; and means for executing the pricing graph via a pricing engine in substantially real time, wherein (i) a value in the market data slot is provided to the market data node and (ii) a value for the investment price slot is received from the investment price node.

Still another embodiment comprises: means for constructing a pricing graph having a plurality of inter-dependent nodes, including: (i) at least one input pricing information node and (ii) at least one output pricing information node, wherein at least one node provides information that effects information received by that node; and means for automatically evaluating the pricing graph to identify potential modes, wherein a mode is associated with a path through the pricing graph.

Yet another embodiment comprises: means for constructing a pricing graph having a plurality of inter-dependent nodes, including: (i) at least one input pricing information node and (ii) at least one output pricing information node; means for establishing a frame with at least one input pricing information slot and at least one output pricing information slot; means for receiving a set of input information; means for executing the pricing graph via a pricing engine based on the set of input information; and means for storing an indication of the set of input information along with an indication of a set of nodes associated with said execution.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 2 is an example of a frame according to some embodiments of the present invention.

FIG. 8 is a tabular representation of a portion of a frame database according to one embodiment of the present invention.

DETAILED DESCRIPTION

Embodiments of the present invention are directed to systems and methods to facilitate generation of "pricing information." As used herein, the phrase "pricing informa-tion" may refer to any financial parameter associated with a price, such as a currency denominated value of an investment instrument (e.g., a stock price). Other examples of pricing information include spreads, spreads over treasuries, swaps, and present values.

Pricing System Overview

Figure 1:
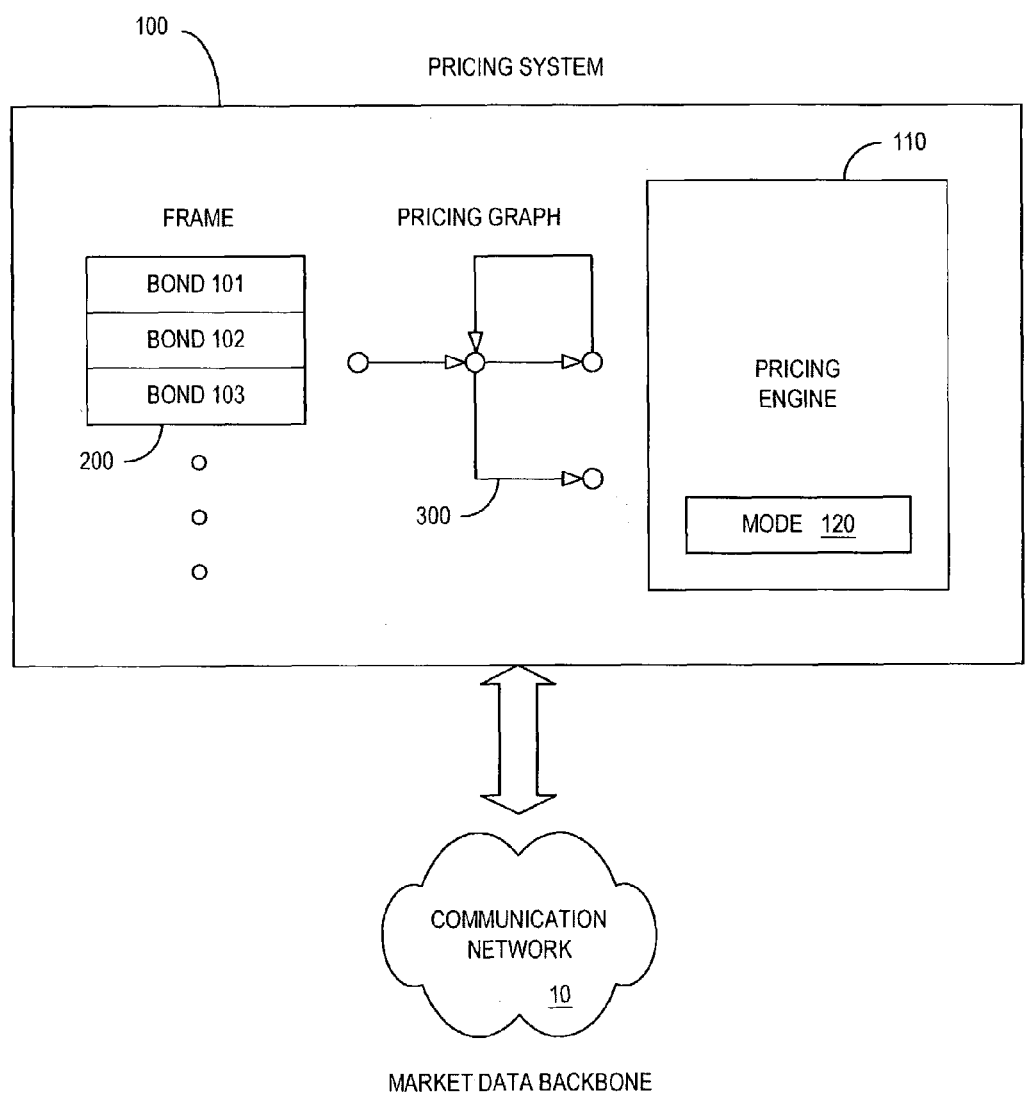
FIG. 1 is a block diagram overview including a pricing system according to some embodiments of the present invention.

FIG. 1 is a block diagram overview including a pricing system 100 that facilitates the generation and/or utilization of pricing information. For example, the pricing system 100 may receive input pricing information (e.g., information that will determine a price of a financial instrument) and generate output pricing information (e.g., the price of the financial instrument) based on the received information.

The pricing system 100 includes a frame 200 that may include one or more pricing information "slots." As used herein, the term "slot" may refer to, for example, a place where a pricing information value can be stored and/or retrieved. The slots in the frame 200 may include, for example, input pricing information and output pricing information slots. According to some embodiments, the frame 200 stores information about a number of different investments (e.g., bonds), each investment being associated with a set of slots (e.g., using different namespaces). The frame 200 is described in more detail with respect to FIG. 2.

The pricing system 100 also includes a pricing graph 300 with a number of inter-dependent "nodes." As used herein, a "node" may be associated with a value (e.g., a frame 200 slot value) and/or a function. Note that a node may be dynamic and/or updated. Also note that the pricing graph 300 may include terminal nodes (e.g., at either end of the pricing graph). For example, the pricing graph may include one or more input pricing information nodes, output pricing information nodes, and/or nodes that define a relationship between the output pricing information nodes and the input pricing information nodes. According to some embodiments, a node might provide information that eventually effects information received by that node (e.g., after the information propagates through the pricing graph 300). The pricing graph 300 is described in more detail with respect to FIG. 3.

The pricing system 100 also includes a pricing engine 110 (e.g., a dependency engine that recognizes when information changes). The pricing engine 110 may execute the pricing graph 300 (e.g., by firing functions associated with nodes) based on information stored in the frame 200. For example, the pricing engine 110 may provide a value in the input pricing information slot to the input pricing information node and receive a value for the output pricing information slot from the output pricing information node. According to some embodiments, the pricing engine 110 is adapted to execute the pricing graph 300 in substantially real time.

Note that the pricing engine 110 may execute the pricing graph 300 using object oriented software (e.g., such as an approach using SMALLTALK®). For example, functions may tie nodes in the pricing graph 300 together, and a library of appropriate functions may be defined for each class. A generic function interface could then be used by the pricing engine 110.

Figure 10:
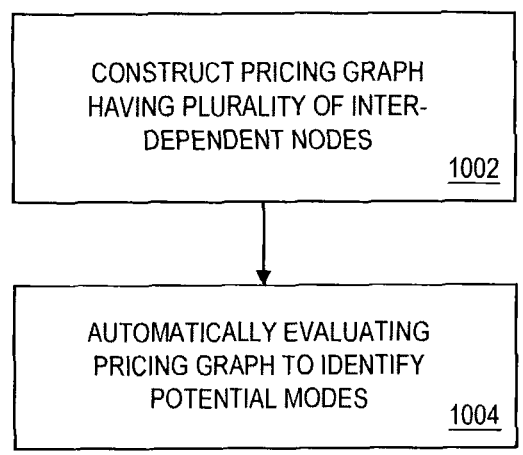
FIG. 10 is a flow chart of an automatic mode evaluation method according to some embodiments of the present invention.

Moreover, the pricing engine 110 may further include mode information 120 as described with respect to FIG. 10.

According to some embodiments, the input pricing information used by the pricing system 100 is received via one or more communication networks 10. By way of example, the communication network 10 may include a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network (e.g., in accordance with an 802.11 standard), and/or an Internet Protocol (IP) network such as the Internet, an intranet, or an extranet.

According to one embodiment, the pricing system 100 receives input pricing information from a market data backbone via the communication network 10. One example of such a market data backbone is the TIB® Market Data Distribution System that provides financial information in substantially real time.

The input pricing information could also be received from a user, such as a user at a local or remote user device (not shown in FIG. 1). For example, the user might enter input pricing information using a Personal Computer (PC) keyboard. The input pricing information could then be transmitted to the pricing system 100 via an electronic mail message or a Web site. According to still other embodiments, the input pricing information is received from another application, such as the MICROSOFT® EXCEL spreadsheet application, or a data file.

The pricing system 100 may also provide output pricing information in any of the ways described above (e.g., via a user device or a market data backbone).

Although a single pricing system 100 is shown in FIG. 1, any number of pricing systems 100 may be included according to embodiments of the present invention. Similarly, any number of other devices or components described herein (e.g., user devices or pricing engines 110) may be included. Also note that the frame 200, the pricing graph 300, and the pricing engine 110 could be incorporated in a single physical device or a number of different devices.

Pricing Frame

FIG. 2 illustrates an example of a frame 200 that stores information about a number of different investment instruments (e.g., "bond 101" and "bond 102"). Although only two investment instruments are illustrated in FIG. 2, the frame 200 may include information about any number of investments (e.g., thousands of different bonds). For each investment, the frame 200 includes a number of different slots containing values for that investment (i.e., "yield," "present value," "price," and "duration").

A slot may be associated with, for example, input pricing information or output pricing information. By way of example, the "yield" slot might be associated with input pricing information (e.g., a yield value might be received from a user or a market data backbone). Similarly, the "price" and "duration" slots might be associated with output pricing information (e.g., generated based on the input pricing information) to be provided to a user.

According to some embodiments, at least a portion of the frame 200 is persistable (e.g., objects, attributes, or other information). That is, the current state of the frame 200 may be saved to be restored at a later time—which can be much more efficient than re-generating the frame 200. According to other embodiments, at least some of the information is associated with singleton memory usage (e.g., such that a class has only one instance). According to still other embodiments, at least some of the information associated with the frame 200 is template-based. For example, a frame template might be defined and used for a number of different investment instruments and/or investment instrument types.

Pricing Graph

Figure 3:
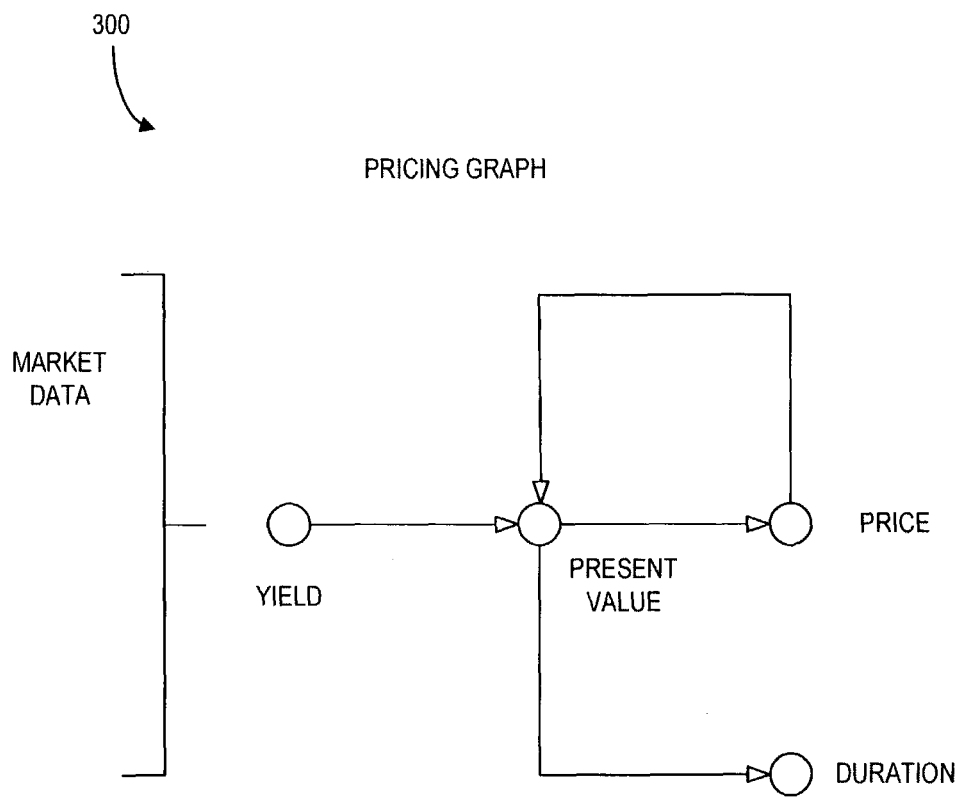
FIG. 3 is an example of a pricing graph according to some embodiments of the present invention.

FIG. 3 is an example of a pricing graph 300 for a bond according to some embodiments of the present invention. In particular, the pricing graph 300 is a directed, bipartite graph that includes a yield input pricing information node. For example, market data information (e.g., broker quotes for a bond and/or information stored in the yield slot of the frame 200) can provide a yield value for the pricing graph 300.

The yield node provides information to a present value node, which in turn provides information to a price node and a duration node. In other words, the present value node is associated with a function performed on information received from at least one other node (i.e., the yield node) to generate information provided to at least one other node (i.e., the price node and the duration node).

Note that the price node also provides information to the present value node. That is, the present value node receives information from both the yield node and the price node. Moreover, information provided by the present value node (i.e., to the price node) may eventually effect information received by the present value node (e.g., after the information propagates through the price node).

The present value node, the price node, and/or the duration node may be output pricing information nodes (e.g., values associated with those nodes may be stored in the frame 200).

According to some embodiments, at least a portion of the pricing graph 300 is persistable (e.g., the current state of the pricing graph 300 may be saved to be restored at a later time). According to other embodiments, at least some of the information is associated with singleton memory usage. According to still other embodiments, at least some of the information associated with the pricing graph 300 is template-based. For example, a pricing graph template might be defined and used for a number of different investment instruments and/or investment instrument types.

Pricing System Method

Figure 4:
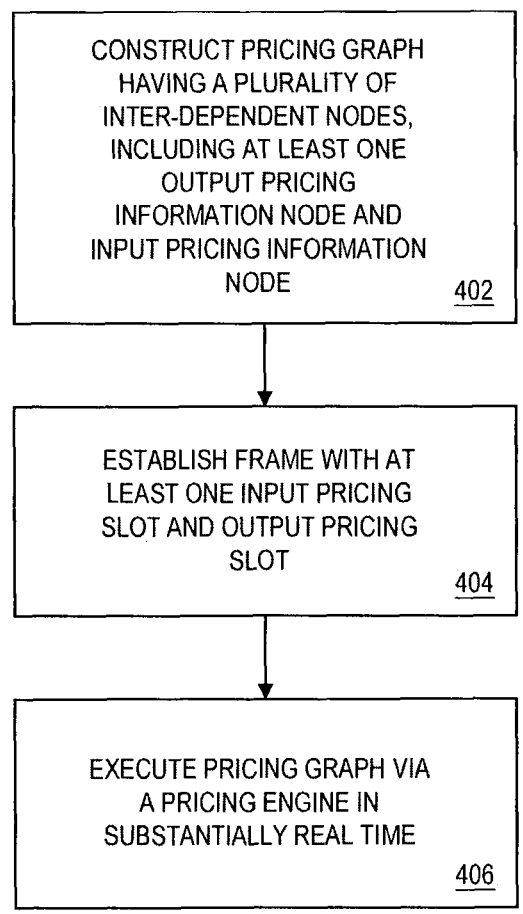
FIG. 4 is a flow chart of a method according to some embodiments of the present invention.

FIG. 4 is a flow chart of a method according to some embodiments of the present invention. The flow charts described herein do not imply a fixed order to the steps, and embodiments of the present invention may be practiced in any order that is practicable.

At 402, a pricing graph with a plurality of inter-dependent nodes is constructed. The pricing graph includes at least one input pricing information node and output pricing information node. According to some embodiments, at least one node in the pricing graph provides information that may effect information received by that node.

The pricing graph may define, for example, how input pricing information should be analyzed (e.g., the effect of an input parameter on an output parameter may be defined). Note that a single pricing graph may be applicable to a number of different investment instruments (e.g., the pricing graph may apply to all stocks in a particular industry).

At 404, a frame is established with at least one input pricing information slot and output pricing information slot. Note that a single frame may contain information about a number of different investment instruments (e.g., the frame may contain information about hundreds of bonds that share a common characteristic).

At 406, the pricing graph is executed via a pricing engine in substantially real time. That is, a value in the input pricing information slot may be provided to the input pricing information node. Moreover, a value for the output pricing information slot may be received from the output pricing information node. Because the pricing graph is executed in substantially real time, the information generated by the pricing system 100 may be published and used, for example, by traders and/or risk managers.

Figure 5:
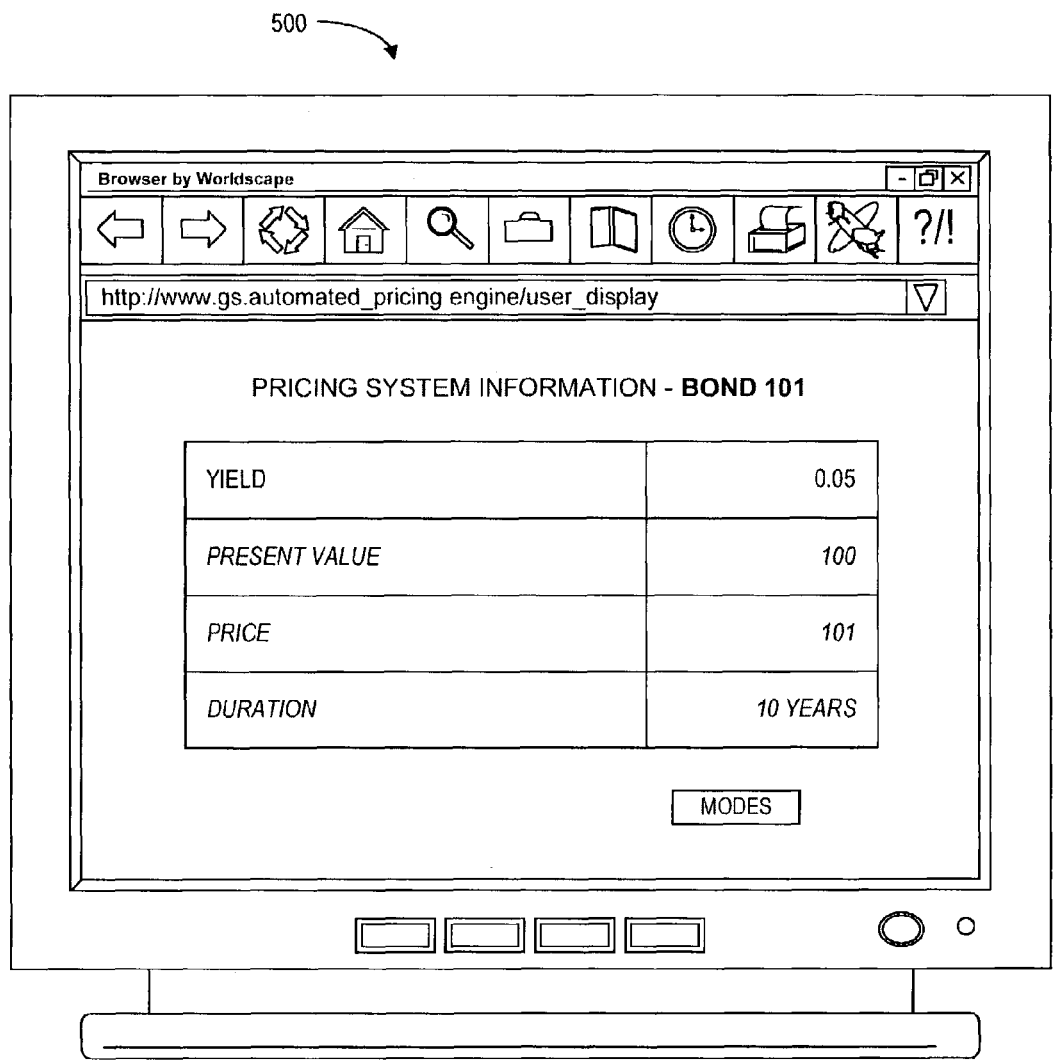
FIG. 5 illustrates a user display according to some embodiments of the present invention.

FIG. 5 illustrates a user display 500 that may be accessed by, for example, a trader and/or a risk manager. In particular, the user display 500 is receiving and providing pricing information associated with a bond (e.g., in accordance with a pricing graph 300 being executed by a pricing engine 110 based on information in a frame 200). In this case, the user can enter a yield value for the bond (i.e., input pricing information) and view present value, price, and duration information (i.e., output pricing information values as represented by italics in FIG. 5). According to some embodiments, the user may also select a mode icon to adjust which parameters comprise input pricing information and which ones comprise output pricing information (e.g., the user might instead enter a value for the duration parameter and view resulting yield, present value, and price information).

Pricing Apparatus

Figure 6:
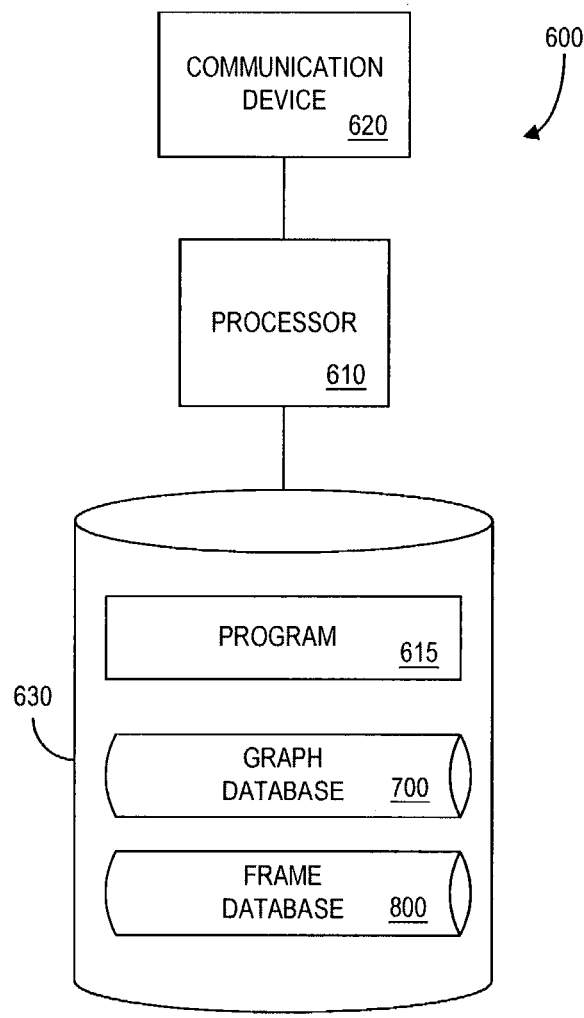
FIG. 6 is a block diagram of a pricing apparatus according to one embodiment of the present invention.

FIG. 6 is a block diagram of a pricing apparatus 600 according to one embodiment of the present invention. The pricing apparatus 600 includes a processor 610, such as one or more INTEL® Pentium® processors, coupled to a communication device 620 configured to communicate via a communication network (not shown in FIG. 6). The communication device 620 may be used to communicate, for example, with one or more user devices and/or a market data backbone.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 630 stores a program 615 for controlling the processor 610. The processor 610 performs instructions of the program 615, and thereby operates in accordance with the present invention. For example, the processor 610 may construct a pricing graph having a plurality of interdependent nodes (e.g., based on information received from a user). The processor 610 may also establish a frame and execute the pricing graph via a pricing engine in substantially real time.

According to another embodiment, the processor 610 automatically evaluates a pricing graph to identify potential modes, wherein a mode is associated with path through the pricing graph (as described with respect to FIG. 10). According to still another embodiment, the processor 610 executes a pricing graph based on a set of input information and stores an indication of the set of input information along with an indication of a set of nodes associated with the execution (as described with respect to FIG. 11).

As used herein, information may be "received" by or "transmitted" to, for example: (i) the pricing apparatus 600 from a user device or market data backbone; or (ii) a software application or module within the pricing apparatus 600 from another software application, module, or any other source.

As shown in FIG. 6, the storage device 630 also stores a graph database 700 (described with respect to FIG. 7) and a frame database 800 (described with respect to FIG. 8). Examples of databases that may be used in connection with the pricing apparatus 600 will now be described in detail with respect to FIGS. 7 and 8. The illustrations and accompanying descriptions of the databases presented herein are exemplary, and any number of other database arrangements could be employed besides those suggested by the figures.

Graph Database

Figure 7:
FIG. 7 is a tabular representation of a portion of a graph database according to one embodiment of the present invention.

Referring to FIG. 7, a table represents the graph database 700 that may be stored at the pricing apparatus 600 according to an embodiment of the present invention. The table includes entries that define one or more pricing graphs 300. The table also defines fields 702, 704, 706, 708, 710 for each of the entries. The fields specify: a graph identifier 702, a node identifier 704, a description 706, inputs 708, outputs 710, and update indications 712. The information in the graph database 700 may be created and updated based on, for example, information received from a user. According to some embodiments, the user may provide the information via a Graphical User Interface (GUI). For example, the user might move and inter-connect nodes on a display.

The graph identifier 702 may be, for example, an alphanumeric code associated with a pricing graph. The node identifier 704 may be an alphanumeric code associated with a node in a pricing graph, and the description 706 may describe the node.

The inputs 708 may define one or more other nodes (or sources) that provide information for the node associated with the node identifier 704. For example, as illustrated by the second entry in FIG. 7, the "present value" node receives information from the "yield" node (i.e., "N101-1") and the "price" node (i.e., "N101-3").

Similarly, the outputs 708 may define one or more other nodes (or destinations) that receive information from the node associated with the node identifier 704. For example, as illustrated by the first entry in FIG. 7, the "yield" node provides information to the "present value" node (i.e., "N101-2").

The update indication 712 may reflect, for example, whether or not a node (i.e., and all of the frame slot values associated with that node) should be updated. For example, because "new" information has recently been received for the yield node, updates to the present value, price, and duration nodes in the pricing graph are "needed." According to another embodiment, update indications are stored in the frame database 800 instead of (or in addition to) the graph database 700.

Frame Database

Referring to FIG. 8, a table represents the frame database 800 that may be stored at the pricing apparatus 600 according to an embodiment of the present invention. The table includes entries associated with slots that define a frame 200. The table also defines fields 802, 804, 806, 808, 810 for each of the entries. The fields specify: an investment identifier 802, a slot description 804, a graph identifier 806, a node identifier 808, and a value 810. The information in the frame database 800 may be created and updated based on, for example, information received from a user or a market data backbone.

The investment identifier 802 may be, for example, an alphanumeric code associated with a particular investment instrument, such as an International Standard Industrial Classification (ISIC) code or a United States Standard Industrial Classification (SIC) code. The slot description 804 describes the information in the entry.

The graph identifier 806 and the node identifier 808, in connection with the information stored in the graph database 700, describe how information in one slot may effect information in another slot. The value 810 reflects a current value associated with the slot (e.g., as input by a user or as calculated by a pricing engine 110 when a pricing graph 300 is executed).

Investment Pricing

Figure 9:
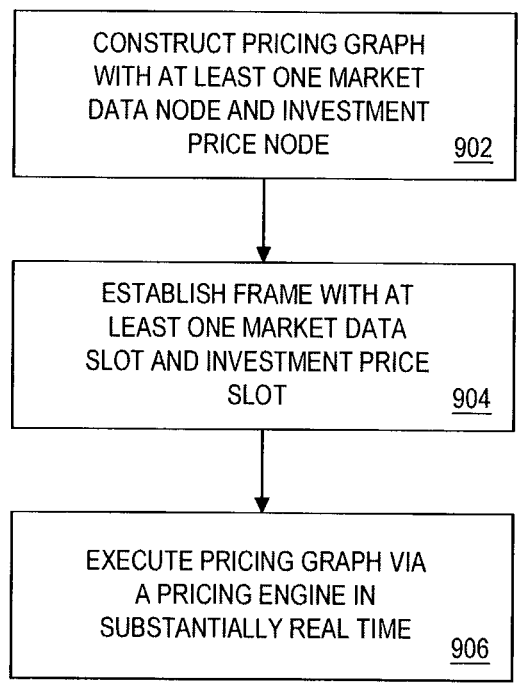
FIG. 9 is a flow chart of an investment pricing method according to some embodiments of the present invention.

FIG. 9 is a flow chart of a computer-implemented investment pricing method according to some embodiments of the present invention. The method may be performed, for example, by the pricing system 100 shown in FIG. 1 and/or the pricing apparatus 600 shown in FIG. 6.

At 902, a pricing graph 300 with a plurality of interdependent nodes is constructed. For example, a user may define or adjust a pricing graph 300 and information in the graph database 700 may be created or updated as appropriate. According to this embodiment, at least one node is associated with market data (e.g., information received from the TIB® Market Data Distribution System) and at least one node is associated with investment price information (e.g., a price or duration).

Note that the pricing graph 300 may be associated with, for example, any type of investment instrument, debt instrument (e.g., a bond), equity instrument (e.g., a stock), fixed-income investment, treasury instrument, future contract, and/or option.

At 904, a frame 200 is established with at least one market data slot and at least one investment price slot. The slots in the frame 200 and/or the nodes in the pricing graph 300 may be associated with, for example, a price input, a financial parameter, a currency denominated amount, a spread, a spread over treasuries, a swap, and/or a present value. As other examples, slots and/or nodes may be associated with a duration, a yield, a volatility, a coupon value, a maturity, a settlement value, a repo rate, market information, a quote, and/or broker information.

At 906, the pricing graph 300 is executed via a pricing engine 110 in substantially real time. For example, a value in the market data slot (i.e., in the frame 200) may be provided to the market data node (i.e., in the pricing graph 300). Similarly, a value for the investment price slot may be received from the investment price node.

Automatic Mode Evaluation

FIG. 10 is a flow chart of an automatic mode evaluation method according to some embodiments of the present invention. At 1002, a pricing graph is constructed with a plurality of inter-dependent nodes. Recall that in the example of a pricing graph 300 described with respect to FIG. 3, information provided by the present value node (i.e., to the price node) may eventually effect information received by the present value node (e.g., after propagating through the price node).

Consider now a user who defines a present value (i.e., the user enters "101" as a present value via the user display 500). In this case, the user will expect that the price and the duration will be updated accordingly. The user, however, will not expect (or want) the present value he or she entered to be changed by the pricing engine 110. That is, the user is interested in viewing information associated with a particular present value. Another user, however, might instead enter price information. In this case, the user will expect that the present value and duration will be updated accordingly and that the price he or she entered will not be changed by the pricing engine 110. That is, the user is interested in viewing information associated with a particular price.

As a result, a single node might need to either receive information or provide information, depending on the user's actions and/or interests. As used herein, the term "mode" is defines a path through a pricing graph 300. That is, a single pricing graph 300 might be executed in accordance with one of a plurality of potential modes. For example, a first mode for the pricing graph 300 illustrated in FIG. 3 might dictate that price will be calculated based on an original present value—and that the original present value will not be updated based on the new price. A second mode for the same the pricing graph 300 might instead dictate that present value will be calculated based on an original price—and that the original price will not be updated based on the new present value.

According to one embodiment, the pricing engine 110 automatically selects an appropriate mode 120 of execution. For example, a particular mode might be automatically selected if a user enters a price value (e.g., by entering the value via the user display 500). According to another embodiment, a user manually selects a mode 120 of execution for the pricing engine 110 (e.g., after activating the mode icon on the user display 500).

In order to properly execute a pricing graph 300, the set of all potential modes may need to be determined. This may be done, for example, by a user who manually reviews the pricing graph 300 to identify potential modes. Such an approach, however, can be difficult and lead to errors—especially if the pricing graph is complicated. According to some embodiments of the present invention, the pricing system 100 instead automatically evaluates a pricing graph 300 to identify the potential modes at 1004. For example, the pricing system 100 may identify cyclical conditions within the pricing graph 300 to identify potential modes of execution (e.g., by scanning the pricing graph 300 looking for paths through which information from a node might return to itself).

Node Execution Cache

Note that only a portion of a pricing graph 300 may need to be updated based on a new set of input pricing information (e.g., that particular set of input pricing information might not effect some of the nodes in the pricing graph 300). Moreover, different sets of input pricing information may require that different portions of the pricing graph 300 be updated (e.g., different sets of nodes).

Consider, for example, a pricing graph with seven nodes, including three input pricing nodes. Table I illustrates how different portions of the pricing graph may need to be updated based on different sets of input pricing information (i.e., a "1" indicating that an input pricing node has received new information).

TABLE I

Required Pricing Graph Updates

| Input Pricing Nodes | | | Other Nodes | | | |
|---|---|---|---|---|---|---|
| 1 | 2 | 3 | 4 | 5 | 6 | 7 |
| 0 | 0 | 0 | | | | |
| 0 | 0 | 1 | update | | | update |
| 0 | 1 | 0 | | | update | update |
| 0 | 1 | 1 | update | | update | update |
| 1 | 0 | 0 | | update | | |
| 1 | 0 | 1 | update | update | | update |
| 1 | 1 | 0 | | update | update | update |
| 1 | 1 | 1 | update | update | update | update |

As can be seen, whenever input pricing node 1 receives new information, node 5 needs to be updated. Similarly, when input pricing node 3 receives new information, nodes 4 and 7 need to be updated. (and when both input pricing node 1 and input pricing node 3 receive new information, nodes 4, 5, and 7 need to be updated). If the pricing engine 110 is not aware of this fact, however, all of the nodes may be updated whenever any new input pricing information is received (i.e., even those nodes that will not change).

Figure 11:
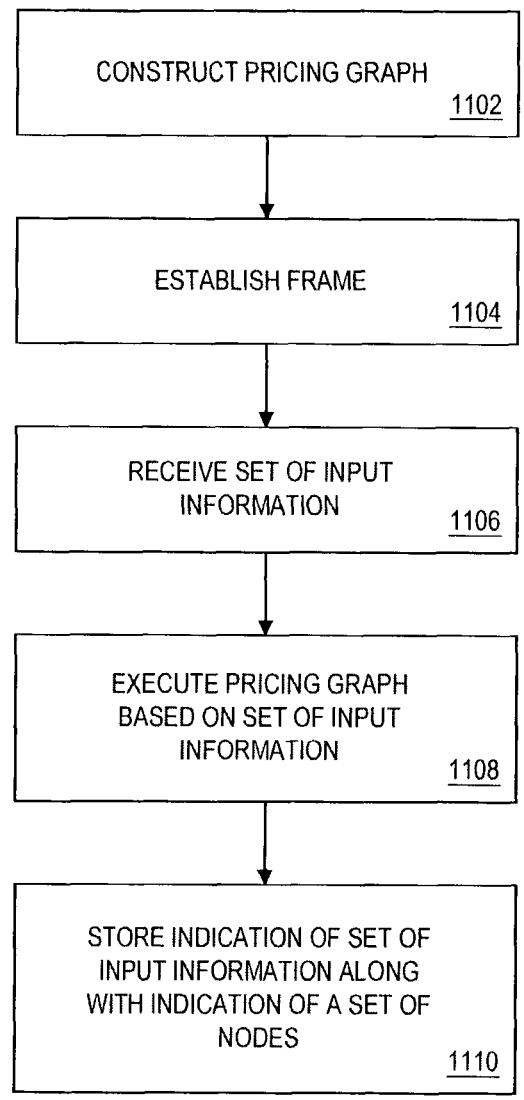
FIG. 11 is a flow chart of a node execution cache method according to some embodiments of the present invention.

FIG. 11 is a flow chart of a node execution cache method according to some embodiments of the present invention. At 1102, a pricing graph is constructed with a plurality of inter-dependent nodes. The pricing graph may include, for example, a number of input pricing information nodes and output pricing information nodes. At 1104, a frame is established (e.g., including a number of input pricing information slots output pricing information slots).

At 1106, a set of input information is received. For example, the frame may be updated with new information for a particular set of input pricing information slots. At 1108, the pricing graph is executed based on the set of input information.

As described above, only some of the nodes in the pricing graph may have actually been changed during execution. As a result, the pricing system 100 stores an indication of the set of input information along with an indication of a set of nodes associated with said execution (e.g., in a node execution cache that contains information similar to the information shown in Table I). In this way, the pricing system 100 can "remember" which nodes needed to be updated for a particular set of input information.

That is, when a second set of input information is received, the pricing system 100 can access the cache to determine an appropriate set of nodes for that set of input information (e.g., and the pricing engine 110 can avoid executing nodes that do not need to be executed for that set).

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

According to some embodiments described herein, a pricing graph 300 is manually defined by a user. According to another embodiment, the pricing graph 300 is instead automatically created. For example, the pricing system 100 may analyze historical pricing information to automatically create an appropriate (i.e., accurate) pricing graph 300.

Moreover, some embodiments have described how information generated by the pricing system 100 can be displayed to a user. According to other embodiments, however, the information is instead automatically provided to other applications. For example, the information may be reviewed and used by an investment instrument trading algorithm or a risk management system.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A pricing apparatus, comprising:
a processor; and
a storage device in communication with the processor, the storage device storing processor-executable instructions that, when executed by the processor, direct the processor to:
construct a pricing graph having a plurality of interdependent nodes, including: (i) at least one input pricing information node and (ii) at least one output pricing information node, wherein at least one of the nodes is configured to provide information that effects information received by the at least one node, a first of the nodes configured to receive input pricing information and provide output pricing information, the pricing graph configured to illustrate a plurality of potential modes, each mode being associated with one of a plurality of paths through the pricing graph, each of the plurality of paths including at least two of the interdependent nodes;
display the pricing graph;
establish a frame with at least one input pricing information slot and at least one output pricing information slot;
determine, based on the input pricing information, a subset of the plurality of interdependent nodes to execute;
execute the pricing graph via a pricing engine upon receipt of the input pricing information, wherein (i) at least one value in the at least one input pricing information slot is provided to the at least one input pricing information node and (ii) at least one value for the at least one output pricing information slot is received from the at least one output pricing information node, wherein the execution includes automatically selecting one of the plurality of potential modes for the execution based on the input pricing information and executing the subset of the plurality of interdependent nodes within the path associated with the potential mode automatically selected; and
display the output pricing information based at least in part on the execution of the pricing graph.

2. The pricing apparatus of claim 1, wherein the processor-executable instructions when executed by the processor, further direct the processor to store an indication of the input pricing information and which of the plurality of interdependent nodes were updated during the execution of the pricing graph.

3. A processor-implemented method to facilitate generation of financial pricing information, the method comprising:
constructing, via a processor, a pricing graph having a plurality of inter-dependent nodes, including: (i) at least one input pricing information node and (ii) at least one output pricing information node, wherein at least one of the nodes is configured to provide information that effects information received by the at least one node, a first of the nodes configured to receive input pricing information and provide output pricing information, the pricing graph configured to illustrate a plurality of potential modes, each mode being associated with one of a plurality of paths through the pricing graph, each of the plurality of paths including at least two of the inter-dependent nodes;
displaying the pricing graph to a user via a display device;
establishing a frame with at least one input pricing information slot and at least one output pricing information slot;
determining, based on the input pricing information, a subset of the plurality of inter-dependent nodes to execute;
executing the pricing graph via a pricing engine upon receipt of the input pricing information, wherein (i) at least one value in the at least one input pricing information slot is provided to the at least one input pricing information node and (ii) at least one value for the at least one output pricing information slot is received from the at least one output pricing information node, wherein the execution includes automatically selecting one of the plurality of potential modes for the execution based on the input pricing information and executing the subset of the plurality of inter-dependent nodes within the path associated with the potential mode automatically selected; and displaying the output pricing information to the user via the display device based at least in part on the execution of the pricing graph.

4. The method of claim 3, wherein at least one of the nodes is configured to receive information from others of the nodes.

5. The method of claim 3, wherein at least one of the nodes is configured to provide information to others of the nodes.

6. The method of claim 3, wherein at least one of the nodes is associated with a function performed on information received from at least one of the other of the nodes to generate information provided to at least another of the nodes.

7. The method of claim 3, wherein the pricing graph comprises a directed, bipartite graph.

8. The method of claim 3, further comprising:
automatically evaluating the pricing graph to identify the potential modes.

9. The method of claim 8, wherein the evaluation comprises identifying cyclical conditions within the pricing graph.

10. The method of claim 3, further comprising:
receiving a user-selected mode, wherein the user-selected mode is used for the execution instead of the mode automatically selected based on the input pricing information.

11. The method of claim 3, wherein the executing comprises:
receiving a set of input information;
executing the pricing graph via the pricing engine based on the set of input information; and
storing data including an indication of the set of input information and an indication of a set of the nodes associated with the execution.

12. The method of claim 11, further comprising:
receiving a second set of input information; and
retrieving the stored data to determine a set of the nodes associated with the second set of input information.

13. The method of claim 3, wherein the frame is associated with a plurality of investments, each investment having a set of slots.

14. The method of claim 3, wherein the pricing graph is associated with at least one of (i) an investment instrument, (ii) a debt instrument, (iii) a bond, (iv) an equity instrument, (v) a stock, (vi) a fixed-income investment, (vii) a treasury instrument, (viii) a future contract, or (ix) an option.

15. The method of claim 3, wherein the output pricing information is associated with at least one of: (i) a price input, (ii) a financial parameter, (iii) a currency denominated amount, (iv) a spread, (v) a spread over treasuries, (vi) a swap, or (vii) a present value.

16. The method of claim 3, wherein at least one of the nodes in the pricing graph is associated with at least one of: (i) a duration, (ii) a yield, (iii) a volatility, (iv) a coupon value, (v) a maturity, (vi) a settlement value, (vii) a repo rate, (viii) market information, (ix) a quote, or (x) broker information.

17. The method of claim 3, wherein the input pricing information is received from at least one of: (i) a user, (ii) a market data backbone, (iii) an application, or (iv) a data file.

18. The method of claim 3, wherein the output pricing information is provided to at least one of: (i) a user, (ii) a market data backbone, (iii) an application, or (iv) a data file.

19. The method of claim 3, wherein the execution is associated with singleton memory usage.

20. The method of claim 3, wherein at least one of the pricing graph, the frame, or the pricing engine is associated with persistable information.

21. The method of claim 3, wherein at least one of the pricing graph, the frame, or the pricing engine is template-based.

22. A pricing apparatus, comprising:
a processor; and
a storage device in communication with the processor and storing instructions adapted to be executed by the processor to:
construct a pricing graph having a plurality of inter-dependent nodes, including: (i) at least one input pricing information node and (ii) at least one output pricing information node, wherein at least one of the nodes is configured to provide information that effects information received by the at least one node, a first of the nodes configured to receive input pricing information and provide output pricing information, the pricing graph configured to provide a plurality of potential modes, each mode being associated with one of a plurality of paths through the pricing graph, each of the plurality of paths including at least two of the inter-dependent nodes;
transmit the pricing graph to a remote user display device;
establish a frame with at least one input pricing information slot and at least one output pricing information slot;
determine, based on the input pricing information, a subset of the plurality of inter-dependent nodes to execute;
execute the pricing graph via a pricing engine upon receipt of the input pricing information, wherein (i) at least one value in the at least one input pricing information slot is provided to the at least one input pricing information node and (ii) at least one value for the at least one output pricing information slot is received from the at least one output pricing information node, wherein the execution includes automatically selecting one of the plurality of potential modes for the execution based on the input pricing information and executing the subset of the plurality of inter-dependent nodes within the path associated with the potential mode automatically selected; and
transmit the output pricing information to the remote user display device based at least in part on the execution of the pricing graph.

23. The pricing apparatus of claim 22, wherein the storage device further stores at least one of: (i) a graph database, or (ii) a frame database.

24. The pricing apparatus of claim 22, further comprising:
a communication device coupled to the processor and adapted to communicate with at least one of: (i) a market data backbone, or (ii) the remote user display device.

25. A non-transitory processor-readable medium storing instructions adapted to be executed by a processor to cause the processor to:
construct a pricing graph having a plurality of inter-dependent nodes, including: (i) at least one input pricing information node and (ii) at least one output pricing information node, wherein at least one of the nodes is configured to provide information that effects information received by the at least one node, a first of the nodes configured to receive input pricing information and provide output pricing information, the pricing graph configured to illustrate a plurality of potential modes, each mode being associated with one of a plurality of paths through the pricing graph, each of the plurality of paths including at least two of the inter-dependent nodes;

display the pricing graph to a user via a display device;

establish a frame with at least one input pricing information slot and at least one output pricing information slot;

determine, based on the input pricing information, a subset of the plurality of inter-dependent nodes to execute;

execute the subset of the plurality of inter-dependent nodes within the pricing graph via a pricing engine upon receipt of the input pricing information, wherein (i) at least one value in the at least one input pricing information slot is provided to the at least one input pricing information node and (ii) at least one value for the at least one output pricing information slot is received from the at least one output pricing information node, wherein the execution includes automatically selecting one of the plurality of potential modes for the execution based on the input pricing information; and display the output pricing information to the user via the display device based at least in part on the execution of the pricing graph.

* * * * *